US012587424B2

(12) United States Patent
Sayed Hassan et al.

(10) Patent No.: US 12,587,424 B2
(45) Date of Patent: Mar. 24, 2026

(54) REARRANGEMENT SCHEME FOR LOW PEAK-TO-AVERAGE POWER RATIO FASTER-THAN-NYQUIST WAVEFORM

(71) Applicant: QUALCOMM Incorporated, San Diego, CA (US)

(72) Inventors: Mohamad Sayed Hassan, Paris (FR); Achraf El Brigui, Palaiseau (FR); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 745 days.

(21) Appl. No.: 18/054,091

(22) Filed: Nov. 9, 2022

(65) Prior Publication Data

US 2024/0154849 A1     May 9, 2024

(51) Int. Cl.
*H04L 27/26* (2006.01)

(52) U.S. Cl.
CPC ...... *H04L 27/2636* (2013.01); *H04L 27/2621* (2013.01); *H04L 27/26534* (2021.01); *H04L 27/26412* (2021.01)

(58) Field of Classification Search
CPC ............. H04L 27/2636; H04L 27/2621; H04L 27/26534; H04L 25/03834; H04L 27/2614; H04L 27/2644; H04L 27/26412
See application file for complete search history.

(56) References Cited

U.S. PATENT DOCUMENTS

| | | | |
|---|---|---|---|
| 2010/0165829 A1 | 7/2010 | Narasimha et al. | |
| 2014/0334572 A1 | 11/2014 | Ozaki et al. | |
| 2019/0052486 A1* | 2/2019 | Kuchi | H04L 27/2614 |
| 2023/0041740 A1* | 2/2023 | Becker | H04B 7/10 |

(Continued)

OTHER PUBLICATIONS

Gunturu A., et al., "Faster than Nyquist Waveform for Beyond 5G Systems—Evaluation and Implementation Aspects", ICC 2022—IEEE International Conference on Communications, IEEE, May 16, 2022, XP034167338, pp. 1859-1864, Section II, figure 1.

(Continued)

*Primary Examiner* — Oussama Roudani
(74) *Attorney, Agent, or Firm* — Holland & Hart LLP

(57) ABSTRACT

Methods, systems, and devices for a rearrangement scheme for a Faster-than-Nyquist (FTN) waveform are described. An example method includes a user equipment (UE) receiving a phase rearrangement indication from a network entity, the phase rearrangement indication indicating one or more parameters associated with a phase rearrangement process for a FTN discrete Fourier transformation spread orthogonal frequency division multiplexing (DFT-s-OFDM) transmission scheme. The method may also include transmitting a signal based at least in part on the phase rearrangement indication and according to the DFT-s-OFDM transmission scheme. Another example method includes a network entity transmitting a phase rearrangement indication indicating one or more parameters associated with a phase rearrangement process for a DFT-s-OFDM transmission scheme and receiving a signal based at least in part on the phase rearrangement indication and according to the DFT-s-OFDM transmission scheme.

18 Claims, 14 Drawing Sheets

(56)                 References Cited

U.S. PATENT DOCUMENTS

2023/0336394 A1 * 10/2023 Liu ..................... H04L 27/2644
2024/0073079 A1 *  2/2024 Ferdinand ............ H04L 5/0048

OTHER PUBLICATIONS

International Search Report and Written Opinion—PCT/US2023/
074412—ISA/EPO—Jan. 18, 2024.
Liu J., et al., "Non-Orthogonal Waveform (NOW) for 5G Evolution
and 6G", 2020, IEEE, 31st Annual International Symposium on
Personal, Indoor and Mobile Radio Communications, IEEE, Aug.
31, 2020, 6 Pages, XP033837696, Figure 1, Section II.

* cited by examiner 510        520        515

505

500

910

920

915

905

900

130

105

115

Network
Entity

Transceiver

Antenna

1210

1215

Communications
Manager

Memory

Code

1230

1220

1225

1240

Processor

1235

1205

1200

Figure 13:
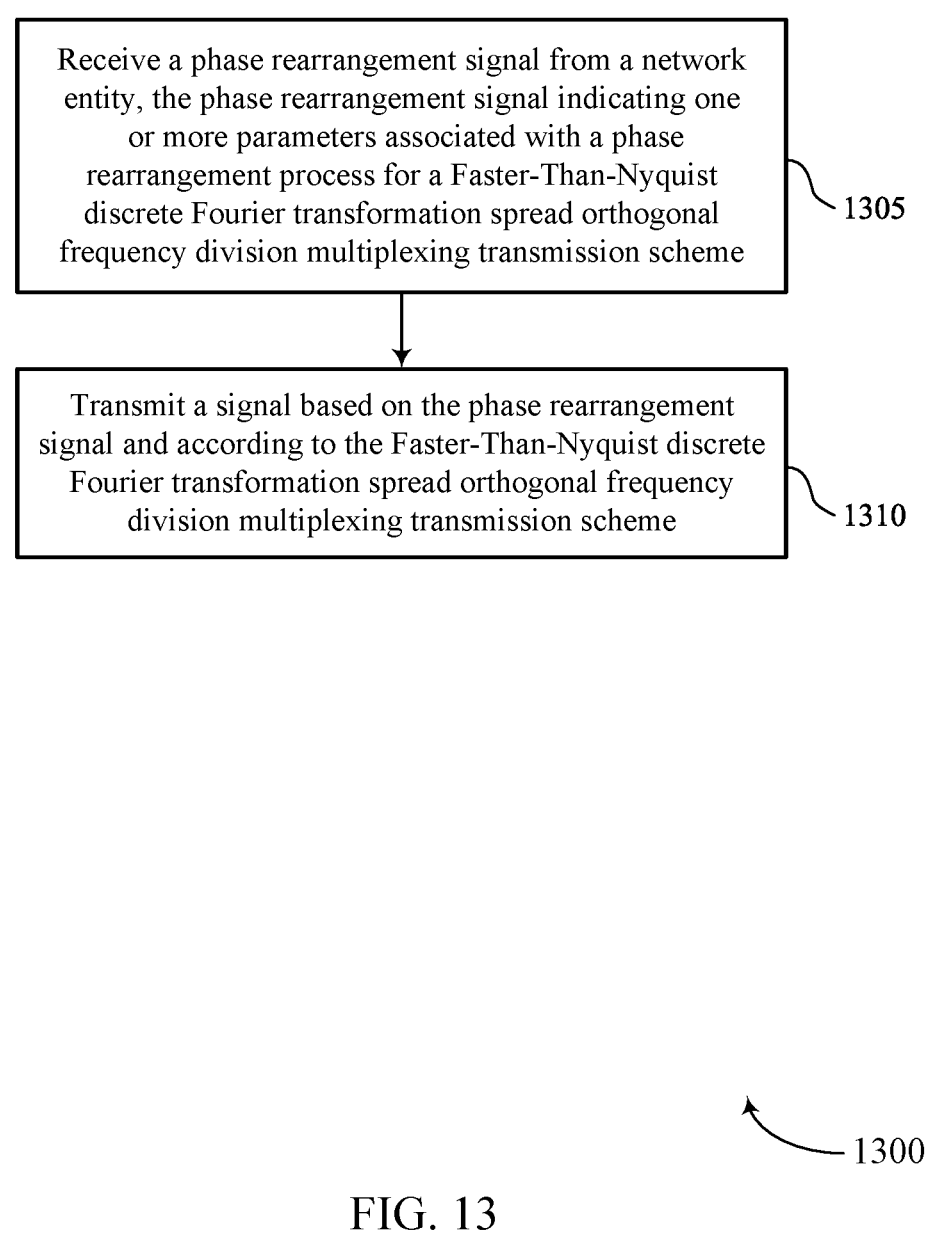

Receive a phase rearrangement signal from a network entity, the phase rearrangement signal indicating one or more parameters associated with a phase rearrangement process for a Faster-Than-Nyquist discrete Fourier transformation spread orthogonal frequency division multiplexing transmission scheme

1305

Transmit a signal based on the phase rearrangement signal and according to the Faster-Than-Nyquist discrete Fourier transformation spread orthogonal frequency division multiplexing transmission scheme

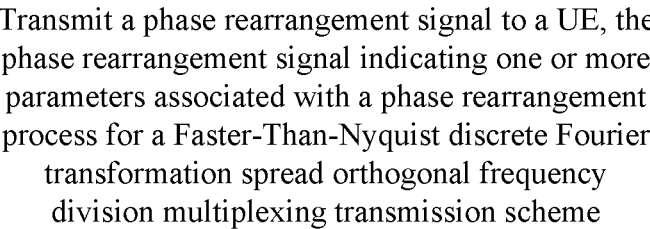

Transmit a phase rearrangement signal to a UE, the phase rearrangement signal indicating one or more parameters associated with a phase rearrangement process for a Faster-Than-Nyquist discrete Fourier transformation spread orthogonal frequency division multiplexing transmission scheme

1405

Receive a signal based on the phase rearrangement signal and according to the Faster-Than-Nyquist discrete Fourier transformation spread orthogonal frequency transmission scheme

1410

REARRANGEMENT SCHEME FOR LOW PEAK-TO-AVERAGE POWER RATIO FASTER-THAN-NYQUIST WAVEFORM

FIELD OF TECHNOLOGY

The following relates to Faster-Than-Nyquist (FTN) waveforms, including a rearrangement scheme for low peak-to-average power ratio (PAPR) FTN waveforms.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, fifth generation (5G) systems which may be referred to as New Radio (NR) systems, and sixth generation (6G) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-s-OFDM). A wireless multiple-access communications system may include one or more base stations, each supporting wireless communication for communication devices, which may be known as user equipment (UE).

5G or 6G or other systems may use FTN waveforms to provide a higher spectral efficiency than other different systems using just cyclic prefix orthogonal frequency division multiplexing (CP-OFDM) or DFT-s-OFDM. However, a peak-to-average power ratio (PAPR) in these systems using FTN waveforms may be too high (e.g., above a threshold) for a particular application.

SUMMARY

The described techniques relate to improved methods, systems, devices, and apparatuses that support rearrangement schemes for low PAPR FTN DTF-s-OFDM waveforms. For example, a method is introduced that can reduce the PAPR for FTN waveforms when combined with DFT-s-OFDM. The method reduces the PAPR for FTN-DFT-s-OFDM scheme by smoothing out (e.g., reducing a variation of) a phase change between samples generated from encoded bits (e.g., a received or generated waveform, a stream of bits) during an uplink or downlink transmission process. An up-sampling function may be performed on the samples according to a configured up-sampling factor. The configured up-sampling factor may result in a sample, s(n), being repeated a number of times based on the configured up-sampling factor. The next, different sample, s(n+1), may have a phase that is different from the previous sample, s(n). As described herein, the sample s(n) and the next sample s(n+1) may be referred to as adjacent samples. Large phase differences (e.g., above a threshold) between the samples may result in a high PAPR. Smoothing the phase difference between s(n) and s(n+1), by applying a smaller phase transition between each repetition of the sample s(n), the PAPR may be reduced. This rearranges the phase difference between the samples.

That is, the phase rearrangement may smooth out a phase difference between the adjacent samples such that the phase difference between two adjacent samples would be spread out among instances of (e.g., repeats of(the earlier sample. Reducing the phase difference between the samples as described herein reduces the resultant PAPR for the corresponding waveform, among other benefits.

A method for wireless communication at a UE is described. The method may include receiving a phase rearrangement indication from a network entity, the phase rearrangement indication indicating one or more parameters associated with a phase rearrangement process for a FTN DTF-s-OFDM transmission scheme and transmitting a signal based on the phase rearrangement indication and according to the FTN DTF-s-OFDM transmission scheme.

An apparatus for wireless communication at a UE is described. The apparatus may include a processor, memory coupled with the processor, and instructions stored in the memory. The instructions may be executable by the processor to cause the apparatus to receive a phase rearrangement indication from a network entity, the phase rearrangement indication indicating one or more parameters associated with a phase rearrangement process for a FTN DTF-s-OFDM transmission scheme and transmit a signal based on the phase rearrangement indication and according to the FTN DTF-s-OFDM transmission scheme.

Another apparatus for wireless communication at a UE is described. The apparatus may include means for receiving a phase rearrangement indication from a network entity, the phase rearrangement indication indicating one or more parameters associated with a phase rearrangement process for a FTN DTF-s-OFDM transmission scheme and means for transmitting a signal based on the phase rearrangement indication and according to the FTN DTF-s-OFDM transmission scheme.

A non-transitory computer-readable medium storing code for wireless communication at a UE is described. The code may include instructions executable by a processor to receive a phase rearrangement indication from a network entity, the phase rearrangement indication indicating one or more parameters associated with a phase rearrangement process for a FTN DTF-s-OFDM transmission scheme and transmit a signal based on the phase rearrangement indication and according to the FTN DTF-s-OFDM transmission scheme.

In some examples of the method, apparatuses, and non-transitory computer-readable medium described herein, the one or more parameters include at least one of an up-sampling factor, an acceleration factor, or an indication of a pulse shaping filter.

Some examples of the method, apparatuses, and non-transitory computer-readable medium described herein may further include operations, features, means, or instructions for determining a phase difference between a first input sample and a second input sample adjacent to the first input sample, and where the signal may be based on the first input sample and the second input sample.

In some examples of the method, apparatuses, and non-transitory computer-readable medium described herein, the phase rearrangement process distributes the phase difference over a number of repetitions of the first input sample based on the one or more parameters associated with the phase rearrangement process.

In some examples of the method, apparatuses, and non-transitory computer-readable medium described herein, the phase difference may be distributed among each consecutive repetition of the first input sample based on the phase rearrangement process and the number of repetitions of the first input sample may be based on an up-sampling factor.

In some examples of the method, apparatuses, and non-transitory computer-readable medium described herein, the phase rearrangement process identifies that the phase difference may be to be distributed evenly among each consecutive repetition of the first input sample.

In some examples of the method, apparatuses, and non-transitory computer-readable medium described herein, the phase rearrangement process rotates a phase of each of the repetitions of the first input sample based on a delta phase step and a repetition index and the delta phase step may be based on the phase difference and the number of repetitions of the first input sample.

In some examples of the method, apparatuses, and non-transitory computer-readable medium described herein, receiving the phase rearrangement indication may include operations, features, means, or instructions for receiving the phase rearrangement indication via at least one of a radio resource control configuration, a radio resource control reconfiguration, a media access control (MAC) control element (CE), or a downlink control information (DCI) signal.

In some examples of the method, apparatuses, and non-transitory computer-readable medium described herein, the phase rearrangement process may be applied to encoded bits after up-sampling the samples and before filter shaping encoded bits and the signal may be based on the encoded bits.

A method for wireless communication at a network entity is described. The method may include transmitting a phase rearrangement indication to a UE, the phase rearrangement indication indicating one or more parameters associated with a phase rearrangement process for a FTN DTF-s-OFDM transmission scheme and receiving a signal based on the phase rearrangement indication and according to the FTN DTF-s-OFDM transformation spread orthogonal frequency transmission scheme.

An apparatus for wireless communication at a network entity is described. The apparatus may include a processor, memory coupled with the processor, and instructions stored in the memory. The instructions may be executable by the processor to cause the apparatus to transmit a phase rearrangement indication to a UE, the phase rearrangement indication indicating one or more parameters associated with a phase rearrangement process for a FTN DTF-s-OFDM transmission scheme and receive a signal based on the phase rearrangement indication and according to the FTN DTF-s-OFDM transmission scheme.

Another apparatus for wireless communication at a network entity is described. The apparatus may include means for transmitting a phase rearrangement indication to a UE, the phase rearrangement indication indicating one or more parameters associated with a phase rearrangement process for a FTN DTF-s-OFDM transmission scheme and means for receiving a signal based on the phase rearrangement indication and according to the FTN DTF-s-OFDM transmission scheme.

A non-transitory computer-readable medium storing code for wireless communication at a network entity is described. The code may include instructions executable by a processor to transmit a phase rearrangement indication to a UE, the phase rearrangement indication indicating one or more parameters associated with a phase rearrangement process for a FTN DTF-s-OFDM transmission scheme and receive a signal based on the phase rearrangement indication and according to the FTN DTF-s-OFDM transmission scheme.

In some examples of the method, apparatuses, and non-transitory computer-readable medium described herein, the one or more parameters include at least one of an up-sampling factor, an acceleration factor, or an indication of a pulse shaping filter.

In some examples of the method, apparatuses, and non-transitory computer-readable medium described herein, transmitting the phase rearrangement indication may include operations, features, means, or instructions for transmitting the phase rearrangement indication via at least one of a radio resource control configuration, a radio resource control reconfiguration, a MAC-CE, or a DCI signal.

Some examples of the method, apparatuses, and non-transitory computer-readable medium described herein may further include operations, features, means, or instructions for determining a peak-to-average power ratio of the signal, comparing the peak-to-average power ratio of the signal to a threshold peak-to-average power ratio, and transmitting an updated phase rearrangement indication to the UE based on comparing the peak-to-average power ratio of the signal to the threshold peak-to-average power ratio.

BRIEF DESCRIPTION OF THE DRAWINGS

FIGS. 13 and 14 illustrate flowcharts showing methods that support rearrangement scheme for low PAPR FTN waveform in accordance with one or more aspects of the present disclosure.

DETAILED DESCRIPTION

Figure 1:
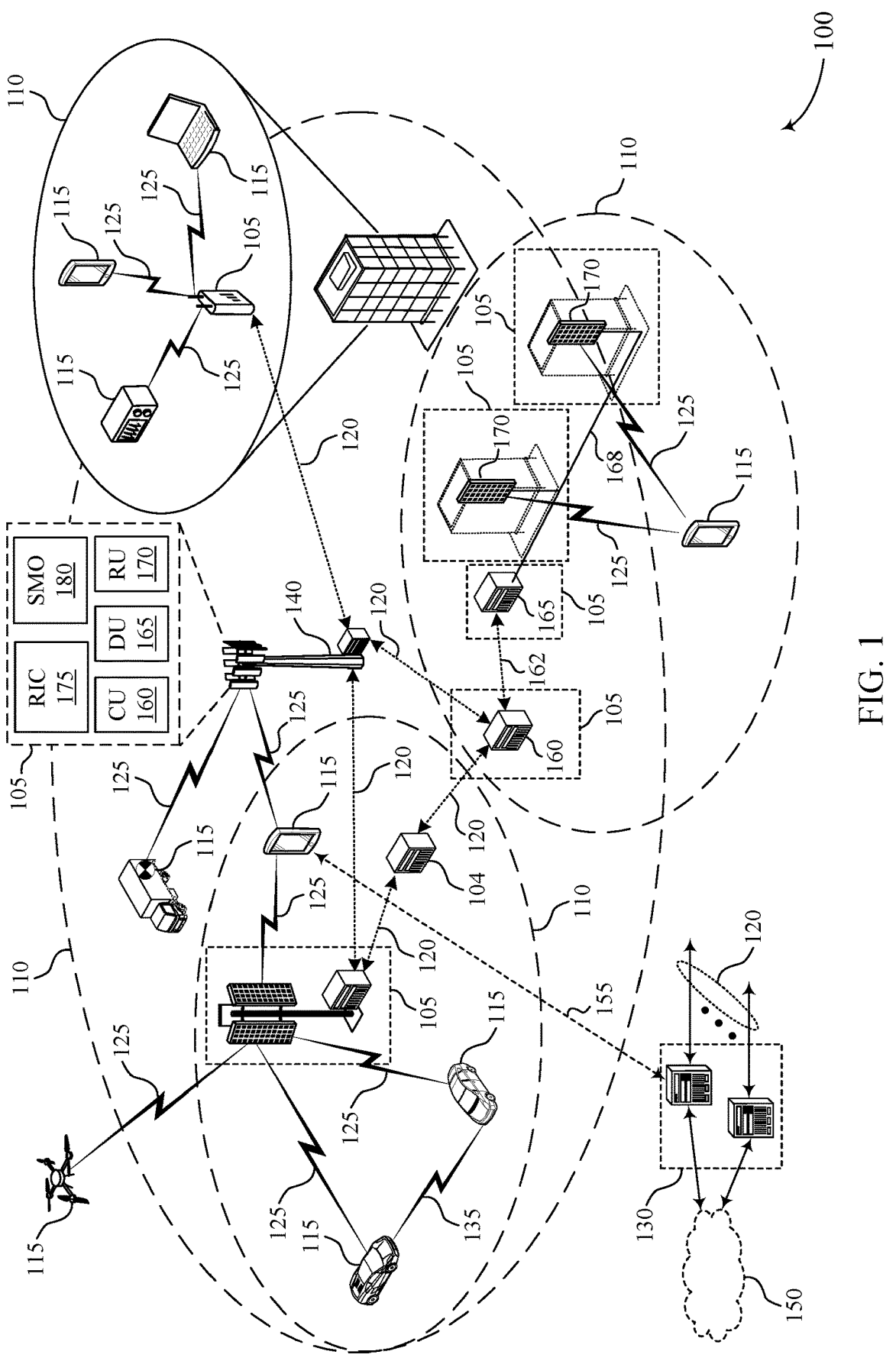
FIG. 1 illustrates an example of a wireless communications system that supports rearrangement schemes for low PAPR FTN DTF-s-OFDM waveforms in accordance with one or more aspects of the present disclosure.

Techniques are described that can reduce the peak-to-average power ratio for FTN waveforms when combined with DFT-s-OFDM. The method reduces the PAPR for FTN-DFT-s-OFDM scheme by smoothing out a phase change between samples of encoded bits during an uplink or downlink transmission process. For an uplink or downlink transmission process, a network entity or UE may process information bits for transmission as a waveform. The processing device may perform an up-sampling function on the encoded and modulated bits according to a configured up-sampling factor. The up-sampling function may take samples of the encoded bits for processing the encoded bits into a transmission signal.

DFT-s-OFDM waveforms may be used for uplink in 5G NR applications, among other examples, because of its low PAPR. However, like CP-OFDM, DFT-s-OFDM waveforms may suffer from low spectral efficiency (in comparison to FTN techniques), thus reducing the system throughput, among other issues. In contrast, an FTN waveform may be used to increase the spectral efficiency. For example, FTN waveforms may be used for communications such as long-distance communications, for example satellite communications between a satellite and a gateway, because it can provide high spectral efficiency. However, the PAPR of systems using FTN alone may be higher compared with those using CP-OFDM or DFT-s-OFDM techniques. By combining DFT-s-OFDM and FTN, the spectral efficiency may be improved over other different alternatives, but the PAPR of the resulting waveforms may need to be further reduced. The techniques described herein provide ways to reduce PAPR when FTN is used with DFT-s-OFDM. This combination of FTN and DFT-s-OFDM techniques, with the enhancements described herein, may result in waveforms with high spectral efficiency and low PAPR. Waveforms created using these techniques may be more suitable for some applications, such as with 6G, among other examples.

FTN techniques may be used in different types of networks, such as networks with some line of sight (LOS) transmissions or for non-terrestrial networks (NTN), such as networks on the sea or in the air. However, as discussed above, using FTN may result in a PAPR that is too high for the particular network's application when FTN is used. Maintaining a lower PAPR may improve performance for transmissions with limited bandwidth or transmissions with higher spectral efficiency. Techniques described herein provide a way to reduce the PAPR for an FTN waveform when combined with DFT-s-OFDM by applying a rearrangement scheme.

The rearrangement scheme may be applied to an up-sampled set of encoded and modulated bits. For example, the up-sampling function may perform up-sampling on samples such as s(n), s(n+1), s(n+2), . . . , to s(n+x). However, the up-sampling process may repeat one of more of each sample based on the up-sampling factor. For example, the up-sampling factor results in a sample, s(n), being repeated a number of times based on the up-sampling factor. The next, different sample, s(n+1), may have a phase that is different from the previous sample, s(n). As described herein, for illustrative purposes, the sample s(n) and the next sample s(n+1) may be referred to as adjacent samples, even though there may be repeats of s(n) between the first sampling of s(n) and the first sampling of s(n+1).

Large phase differences between the samples may result in a high PAPR. For example, larger phase differences between s(n) and s(n+1) or between s(n+1) and s(n+2) (or between both sets) may result in a higher PAPR. Smoothing out the phase difference or slowing the phase change between the adjacent samples (e.g., between s(n) and s(n+1) and between s(n+1) and s(n+2)) may reduce the PAPR for the resulting waveform. The phase difference between the adjacent samples may be reduced by applying a smaller phase transition between each repetition of the samples. For example, if the phase difference between s(n) and s(n+1) is given as $\delta$, the rearrangement scheme described herein may spread the phase difference $\delta$ among all the repetitions of the sample s(n). For example, if the up-sampling factor is given as F (wherein F is a positive integer and may be configured by a network entity), then there will be F−1 repetitions of the sample s(n). A phase difference of $\delta/F$ may be applied between each consecutive repetition of s(n), so that the last repetition of s(n) (i.e., the F-1th repetition of s(n)) has a phase difference of $\delta/F$ compared with the phase of s(n+1). This process thus rearranges the phase difference between the samples and reduces the PAPR of the resultant waveform. In contrast, the phase difference between s(n) and s(n+1) without the phase rearrangement process would be $\delta$, and result in a waveform with a higher PAPR. In this example, the phase difference $\delta$ between s(n) and s(n+1) was distributed evenly among the repeated samples. However, in other examples, $\delta$ may be distributed unevenly between the repeated samples.

An example where the up-sampling factor is set to 4 is described. An up-sampling factor of 4 means that a first sample, s(0), may be sampled and then repeated 3 times. This results in 3 repetitions of s(0), for a sample set of s(0), s(0), s(0), s(0). The next sample, s(1), may also be sampled and repeated 3 times, for s(1), s(1), s(1), s(1). A phase difference $\delta$ between s(0) and s(1) may be spread out over all of the s(0) samples (i.e., evenly or unevenly). By doing this, the phase difference $\delta$ is distributed between the repeated samples, and thus the PAPR is reduced.

The network may inform a UE of one or more parameters associated with the rearrangement scheme. For example, a network entity may signal to the UE one or more of the up-sampling factor, how or where the rearrangement scheme is going to be applied, and any other relevant parameters (e.g., an acceleration factor, pulse shaping filter), among other information. The network entity may signal this information to the UE in a static, semi-static, or dynamic way. The signal may be in a Radio Resource Control (RRC) configuration, an RRC reconfiguration, a medium access control (MAC) control element (MAC-CE), or in downlink control information (DCI).

The techniques described herein may be applied to transmissions with limited bandwidth, transmissions with higher spectral efficiency than those with CP-OFDM or DFT-s-OFDM without FTN techniques, for line of sight communications, and for NTN communications. The techniques may be used in other applications and situations as well.

The solutions described herein provide a further reduction in PAPR beyond what is currently specified for uplink (UL) in some systems, such as 5G systems. Prior to a pulse-shaping step in the transmission signal processing, the input may be up-sampled and phase rotated (e.g., the samples are multiplied by $1^{i\varphi}$) to provide a smoother phase transition using repeated samples and the determined phase of adjacent input samples. Maintaining a lower PAPR may improve performance for transmissions with limited bandwidth or transmissions with higher spectral efficiency. The techniques described herein may also mitigate some inter-symbol interference due to multi-path, among other benefits.

Aspects of the disclosure are initially described in the context of wireless communications systems. Aspects of the disclosure are further described in the context of block diagrams and a process flow diagram. Aspects of the disclosure are further illustrated by and described with reference to apparatus diagrams, system diagrams, and flowcharts that relate to rearrangement scheme for low PAPR FTN waveform.

FIG. 1 illustrates an example of a wireless communications system 100 that supports rearrangement schemes for low PAPR FTN DTF-s-OFDM waveforms in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, MAC layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support rearrangement scheme for low PAPR FTN waveform as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as OFDM (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz. The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The techniques described herein may include receiving a phase rearrangement indication from a network entity, the phase rearrangement indication indicating one or more parameters associated with a phase rearrangement process for an FTN DTF-s-OFDM transmission scheme. The techniques may further include transmitting a signal based at least in part on the phase rearrangement indication and according to the FTN DTF-s-OFDM transmission scheme.

In another example, the techniques described herein may include transmitting a phase rearrangement indication to a UE, the phase rearrangement indication indicating one or more parameters associated with a phase rearrangement process for a FTN DTF-s-OFDM transmission scheme. The technique may further include receiving a signal based at least in part on the phase rearrangement indication and according to the FTN DTF-s-OFDM transmission scheme.

The phase rearrangement techniques described herein may smooth out a phase difference between adjacent samples such that the phase difference between two adjacent samples would be spread out among repeats of the earlier sample. Reducing the phase difference between the samples reduces the resultant PAPR for the corresponding waveform.

Figure 2:
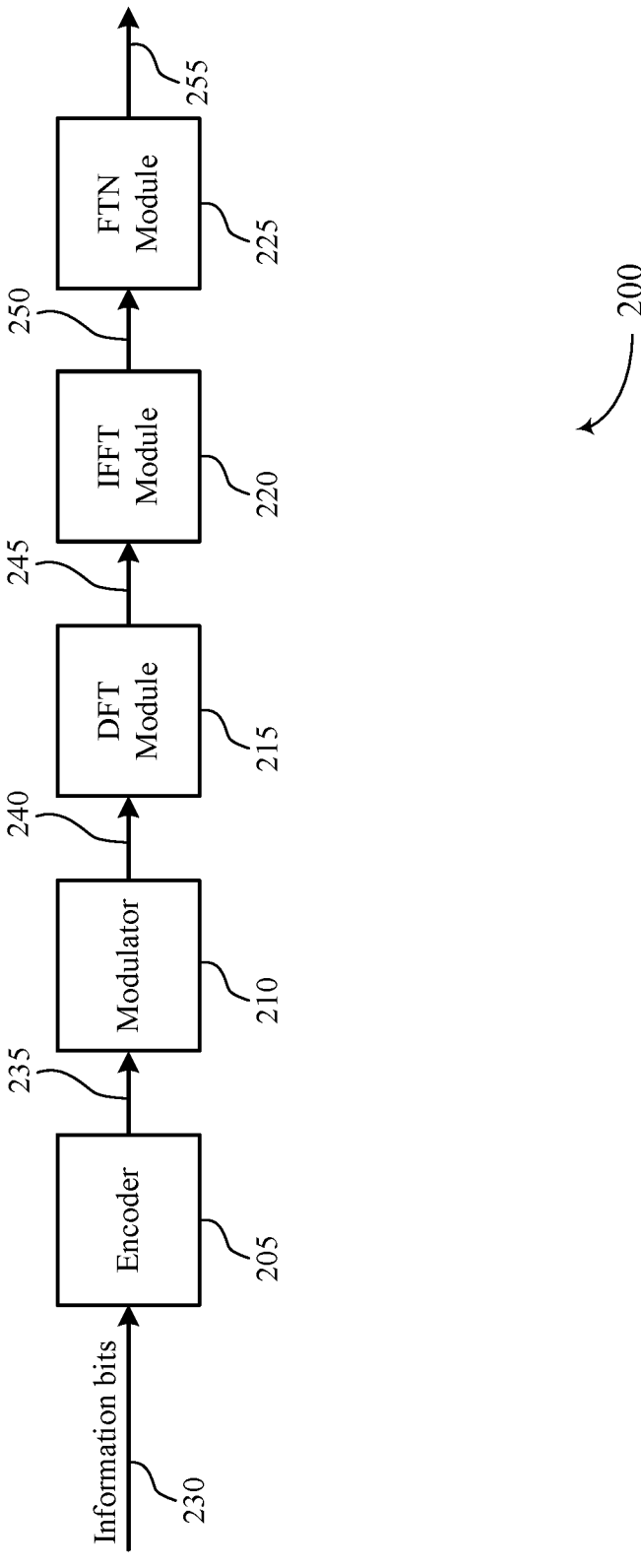
FIG. 2 illustrates an example of a block diagram of a transmission scheme that supports rearrangement schemes for low PAPR FTN DTF-s-OFDM waveforms in accordance with one or more aspects of the present disclosure.

FIG. 2 illustrates an example of a block diagram of a transmission scheme 200 that supports rearrangement schemes for low PAPR FTN DTF-s-OFDM waveforms in accordance with one or more aspects of the present disclosure. The transmission scheme 200 shows an FTN DTF-s-OFDM transmission scheme with FTN modulation according to the techniques described herein. The transmission scheme 200 may be an example of aspects of a UE 115 or a network entity 105 as described herein.

The transmission scheme 200 may include an encoder 205, a modulator 210, a DFT module 215, an inverse fast Fourier transform (IFFT) module 220, and an FTN module 225. Each of these components may be in communication with one another (e.g., via one or more buses). Each of these components may be part of one or more processors of a UE 115 or a network entity 105.

Information bits 230 may be inputted into the encoder 205. The information bits 230 may have been received at a receiver of a UE 115 or a network entity 105 or generated at the UE 115 or the network entity 105. The transmission scheme 200 may process the information bits 230 to create an output signal 255 for transmission.

The encoder 205 may be a channel encoder. The encoder 205 may encode the information bits 230 and provide encoded bits 235 to the modulator 210. The modulator 210 may modulate the encoded bits 235 and provide modulated bits 240 to the DFT module 215. The DFT module 215 may perform a discrete Fourier transform on the modulated bits 240 to create transformed bits 245, which is input to an IFFT module 220. The IFFT module 220 performs an inverse fast Fourier transform on the transformed bits 245 to create inverse bits 250. The IFFT module 220 may use any type of IFFT filter. In some examples, a frequency-domain spectral shaping (FDSS) filter may be applied between the DFT module 215 and the IFFT module 220.

The inverse bits 250, which is based on the information bits 230, is input to the FTN module 225. The FTN module 225 performs up-sampling on the inverse bits 250 to take samples, performs the rearrangement scheme on the samples, and applies a pulse shaping filter, to output the output signal 255. The FTN module 225 may apply the rearrangement scheme as described herein. The FTN module 225 is shown in further detail with respect to FIG. 3. The output signal 255 may be transmitted by the UE 115 or network entity 105.

FIG. 2 illustrates just one example of a possible FTN DTF-s-OFDM transmission scheme. In other examples, less or additional signal processing may be performed on the information bits 230. In some examples, additional processing is performed on the output signal 255 before transmitting the signal.

Figure 3:
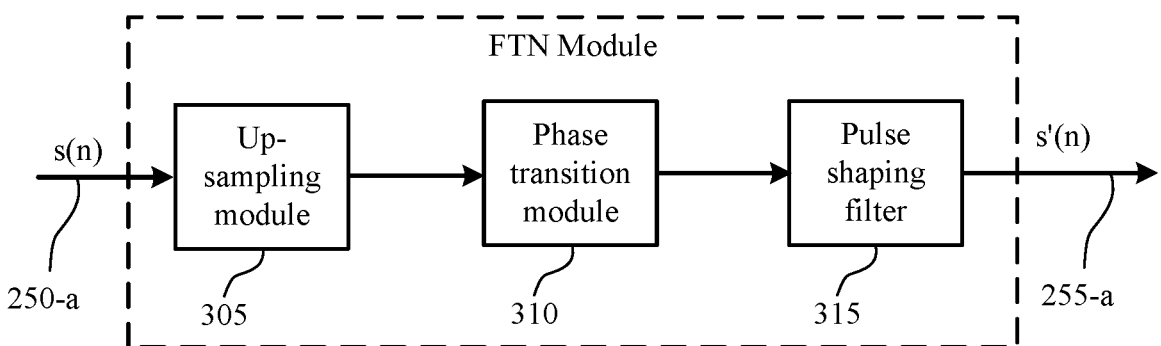
FIG. 3 illustrates an example of an FTN module that supports rearrangement schemes for low PAPR FTN DTF-s-OFDM waveforms in accordance with one or more aspects of the present disclosure.

FIG. 3 illustrates an example of an FTN module 300 that supports rearrangement schemes for low PAPR FTN DTF-s-OFDM waveforms in accordance with one or more aspects of the present disclosure. The FTN module 300 may include an up-sampling module 305, a phase transition module 310, and a pulse shaping filter module 315. The FTN module 300 may be an example of the FTN module 225 as described in FIG. 2. The FTN module 300 may be part of an FTN DTF-s-OFDM scheme with FTN modulation according to the techniques described herein. The FTN module 300 may be an example of aspects of a UE 115 or a network entity 105 as described herein.

An inverse signal 250-a, which may be an example of the inverse signal 250 of FIG. 2, may be inputted to the FTN module 300. The inverse signal 250-a may be sampled into samples s(n), s(n+1), s(n+2), s(n+x) by an up-sampling module 305. As used herein, n may be an integer that denotes a particular sample of the inverse signal 250-a, and x may be a positive integer that denotes a total number of samples taken of the inverse signal 250-a. The up-sampling module 305 may apply a repeating factor, so that the output may be s(n), . . . , s(n), s(n+1), s(n+1), s(n+2), s(n+2), s(n+x), s(n+x).

The up-sampling module 305 may perform an up-sampling function on the inverse signal 250-a according to a configured sampling factor. The FTN module 300 may set the up-sampling factor based on a phase rearrangement indication received from a network entity. The up-sampling module 305 may perform up-sampling on the inverse signal 250-a based at least in part on the configured up-sampling factor, which may result in a sample, s(n), being repeated a number of times based on the up-sampling factor, T. The up-sampling factor may define a rate at which an input signal is sampled. The up-sampling module 305 may perform the up-sampling function by repeating the same time domain sample or by inserting a zero. For a given sample s(n), the up-sampling module 305 may output the sample s(n) F times. For example, if the up-sampling factor is 6, the up-sampling module 305 may output s(n) and then 5 copies of s(n), s(n), s(n), s(n), and s(n) for the first sample. The up-sampling module 305 may perform the up-sampling function on a next sample, s(n+1), and output s(n+1), s(n+1), s(n+1), s(n+1), and s(n+1). These samples may be time domain samples.

The techniques described herein may support different approaches to performing the up-sampling. In one example where zeros are entered, for an up-sampling factor of 3, then the output may be s(n), 0, 0. The up-sampling factor may include the original sample when counting the total number of samples. In another example where the sample is repeated, for an up-sampling factor of 3, then the output may be s(n), s(n), s(n), s(n). In other examples, other techniques and outputs may be used.

An up-sampling factor may be selected by a network entity. The network entity may consider one or more factors for selecting the up-sampling factor. For example, the larger the up-sampling factor, the higher the acceleration and the change of getting inter-sample interference increases. In FTN, transmissions of the up-sampled samples may occur at the same time, and many samples may be sent per time for the code. Thus, a higher up-sampling factor causes more samples to be transmitted, which causes greater inter-sample interference. Another factor to consider is a bit error rate for the transmission. Higher interference from higher up-sampling factors, which leads to more inter-sample interference, could cause a higher bit error rate. The network entity may balance PAPR against interference and a bit error rate threshold or limit.

The up-sampling module 305 may provide all of the samples (including the repetitions, collectively referred to herein as "samples") to the phase transition module 310. The phase transition module may apply the rearrangement scheme to the samples. The rearrangement based approach may be applied after the up-sampling function in order to have a smaller step change of the phase between consecutive time domain samples after the up-sampling function. In other examples, the rearrangement scheme may be applied at a different point during the transmission scheme. In some examples, the network may indicate to a UE where to apply the rearrangement scheme.

The phase transition module 310 may determine a phase difference between two adjacent samples at the input of the up-sampling module 305. For example, the phase transition module 310 may calculate a phase difference, $\delta$, between s(0) and s(1), s(1) and s(2), etc. For example, the phase difference $\delta$, between s(0) and s(1), would be provided as the phase of s(1) minus the phase of s(0). The delta phase step is equal to the phase difference (delta phase) previously calculated divided by the up-sampling factor, T. That is, the phase difference that will be applied to each repetition of the sample, the delta phase step, will be T. In some examples, the up-sampling module 305 may determine the phase difference and the delta phase step. As discussed above, the up-sampling module 305 may repeat the input samples that have been up-sampled.

The phase transition module 310 may apply the delta phase step to the repeated samples. The phase transition module 310 may apply a phase transition to the repeated samples by rotating the phase of the repeated samples based at least in part on the delta phase step and a repetition index. An example having an up-sampling factor of 4 may result in a delta phase step of $\delta/4$ or $\pi\delta/4$. The phase transition module 310 may rotate the phase of each consecutive repeated sample by $\delta/4$ or $\pi\delta/4$ so that the phase difference is spread out among all the repeated samples. The phase transition module 310 may apply the phase changes evenly or unevenly between samples. That is, a larger portion of the phase difference may be applied to one sample than to another. Or each sample may see the same amount of phase rotation.

A symbol rate may be $1/\alpha T$, wherein $\alpha$ is an acceleration factor and T is a symbol duration. The acceleration factor may be a number between 0 and 1. When the acceleration factor is 1, the up-sampling module 305 will not perform any sampling. In that case, the transmission scheme would be the same as an FTN DFT-s-OFDM transmission scheme without using the up-sampling. The network entity may provide an indication of the acceleration factor to the UE or the UE may be configured with the acceleration factor. For example, if a symbol is repeated T=4 times, i.e., s(n), s(n), s(n), s(n), the acceleration factor will be ¼ or $$T = \frac{1}{\alpha}.$$

When up-sampling with repeated samples is used, the acceleration factor may be equal to 1/T.

The phase transition module 310 may apply the delta phase step to the repeated samples. Applying the phase transition through the delta phase step smooths the phase difference between two adjacent samples. This may allow a reduction of the fluctuation in the envelope of the transmitted signal. The envelope may reflect the amplitude or the power of the transmitted signal. In general, a transmission where the envelope is nearly constant has a low PAPR. However, when the transmission varies a lot in the envelope, the transmission has a high PAPR. That is, high fluctuations in the envelope leads to a high PAPR. The rearrangement scheme reduces the envelope by reducing the phase transition between samples, which reduces the steps in phase between the samples such that there is not a large phase transition between the samples. This results in a smoother envelope, and thus a lower PAPR.

The pulse shaping filter module 315 may receive the rearranged samples and apply a pulse shaping filter. The pulse shaping filter may be denoted as go. The pulse shaping filter module 315 may use any pulse shaping filter, such as a square-root raised cosine (SRRC) filter.

The output signal 255-a, s'(n), may be defined as:

$$s'(n) = E_s \sum_n s(n)g(t - n\alpha T)$$

wherein $E_s$ is the energy of the signal. In other examples, other equations to determine the output signal 255-a may be used. In some examples, a normalization may be applied to determine the output signal 255-a.

The signal processing of the FTN module 300 is merely one example of the processing possible using the techniques described herein. By applying a rearrangement scheme, the phase difference $\delta$ may be distributed between among several samples, thus reducing PAPR. This may lead to improved user experience, power savings, spectral efficiency, among other benefits.

Figure 4:
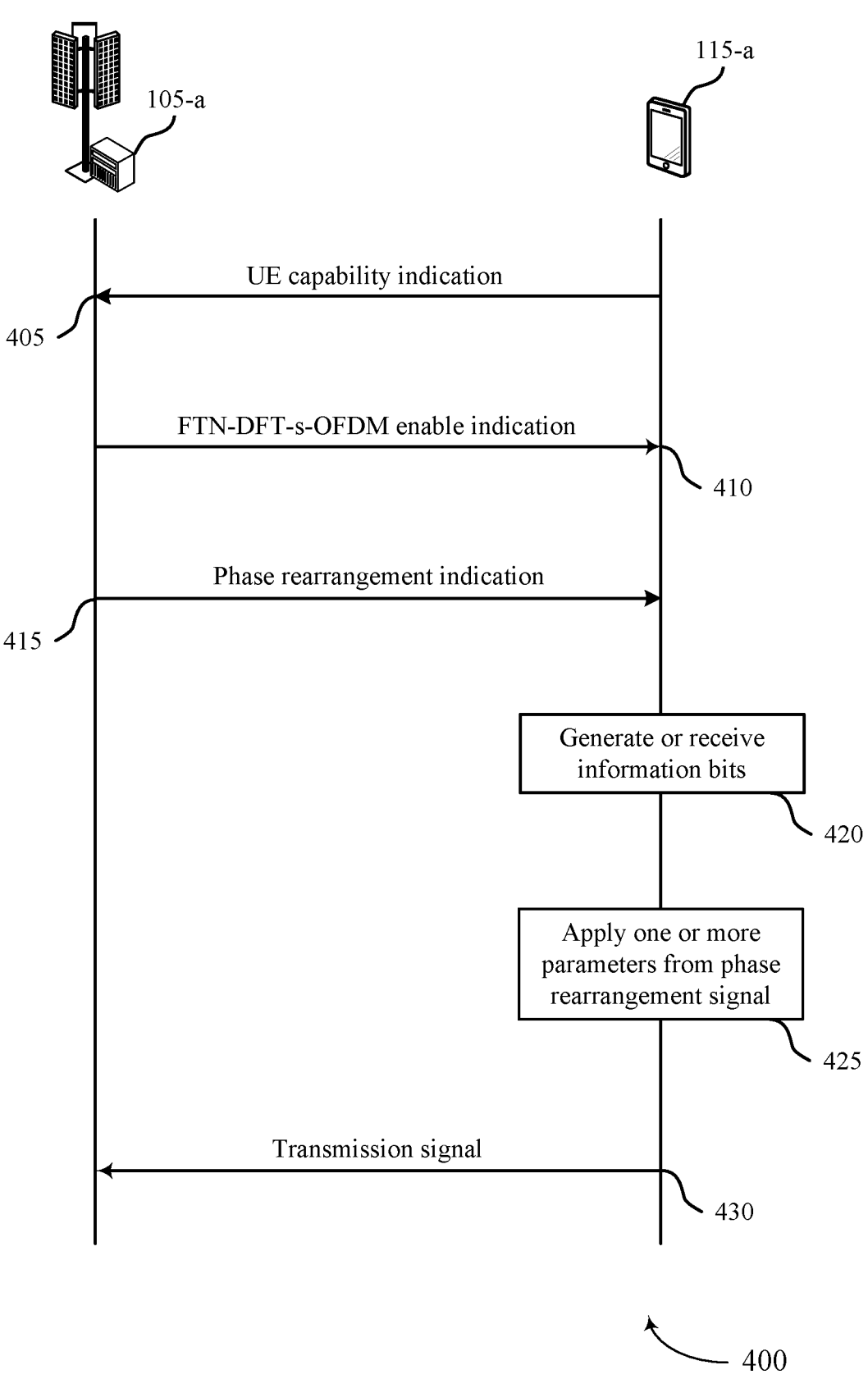
FIG. 4 illustrates an example of a flow diagram that supports rearrangement schemes for low PAPR FTN DTF-s-OFDM waveforms in accordance with one or more aspects of the present disclosure.

FIG. 4 illustrates an example of a flow diagram 400 that supports rearrangement schemes for low PAPR FTN DTF-s-OFDM waveforms in accordance with one or more aspects of the present disclosure. The flow diagram 400 includes a network entity 105-a and a UE 115-a. The network entity 105-a may be an example of aspects of a network entity 105 as described herein. The UE 115-a may be an example of aspects of a UE 115 as described herein.

At 405, the UE 115-a may send the network entity 105-a a UE capability indication. The UE capability indication may indicate that the UE is capable of performing a rearrangement scheme. The UE capability indication may indicate that the UE is capable of creating FTN DTF-s-OFDM waveforms.

Once the network entity 105-a is aware of the UE capabilities, the network entity 105-a may send an FTN DTF-s-OFDM enable indication at 410. The UE 115-a may enable FTN DTF-s-OFDM features based on receiving the FTN DTF-s-OFDM enable indication.

The network entity 105-a may also determine one or more parameters associated with the rearrangement scheme. The one or more parameters may include an up-sampling factor, an indication of where the rearrangement is to be applied at the transmission, an indication of when the rearrangement is to be applied, an acceleration factor, a pulse shaping filter, or any other relevant factors. The network entity 105-a may inform the UE 115-a of the one or more parameters via a phase rearrangement indication at 415. The one or more parameters may be send in an information element, as an index, a flag (such as, for example, a 1 or 2 bit flag), or another method in order to indicate which scheme is to be applied.

For example, the network entity 105-a may directly signal the phase rearrangement indication to the UE by indicating what method of up-sampling to use and what pulse shaping filter to use. Each method of up-sampling may have a unique identifier. Likewise, different pulse shaping filters may have different identifiers. The network entity 105-a may include the identifiers in the phase rearrangement indication, and the UE 115-a may know what the identifiers indicate.

The network entity 105-a may signal the information in the phase rearrangement indication to the UE 115-a in a static, semi-static, or dynamic way. The signal may be in a RRC configuration, an RRC reconfiguration, a MAC-CE, or in DCI. For example, if the network entity 105-a detects that the PAPR should be decreased, the network entity 105-a may update the one or more of the one or more parameters and send the phase rearrangement indication again. That is, the network entity 105-a may dynamically update the UE 115-a with the phase rearrangement indication. The network entity 105-a may do so if it determines that the PAPR is above a threshold PAPR level.

In some examples, the phase rearrangement scheme may be adaptive. For example, the phase rearrangement scheme may be flexible based on modulation, coding schemes, resource allocation, or any other metric. In some examples, an FTN-DFT-s-OFDM receiver based on successive interference cancellation can be re-used for the FTN-DFT-s-OFDM enhanced with the rearrangement scheme.

The UE 115-a may generate or receive information bits for transmission at 420. The UE 115-a may apply the one or more parameters from the phase rearrangement indication and perform the phase rearrangement scheme on the samples created from the encoded information bits at 425. The UE 115-a may perform the phase rearrangement scheme according to the description and alternatives described herein. The UE 115-a may transmit the output signal as a transmission signal at 430. Although described herein as the transmission signal being for uplink, the phase rearrangement scheme may be applied for downlink as well.

Figure 5:
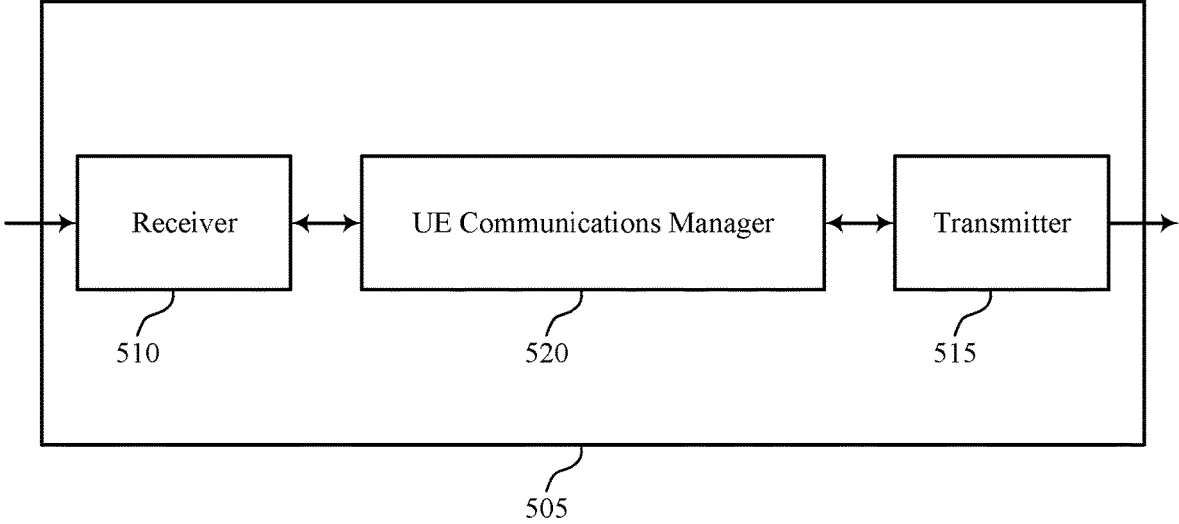
FIGS. 5 and 6 illustrate block diagrams of devices that support rearrangement scheme for low PAPR FTN waveform in accordance with one or more aspects of the present disclosure.
Figure 6:
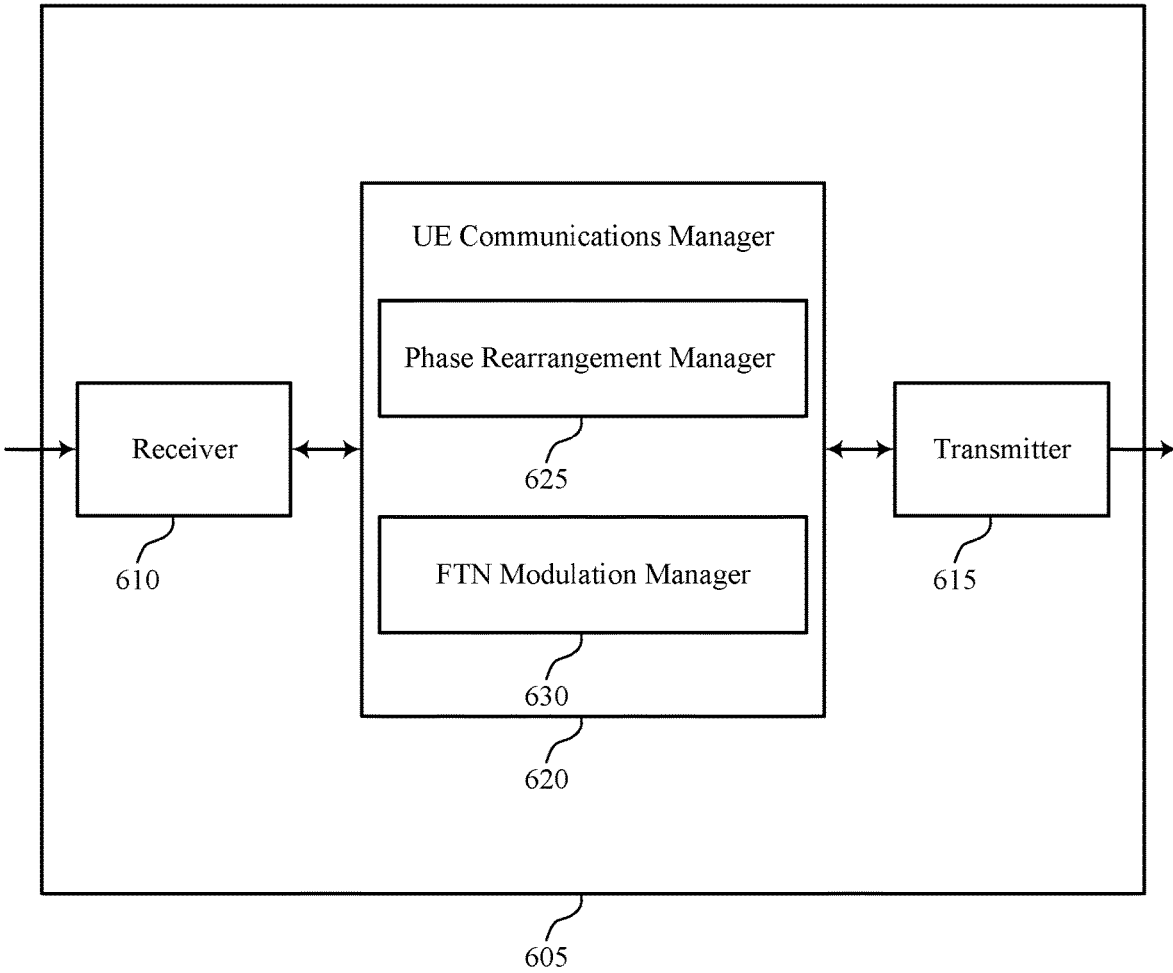

FIG. 5 illustrates a block diagram 500 of a device 505 that supports rearrangement schemes for low PAPR FTN DTF-s-OFDM waveforms in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to rearrangement scheme for low PAPR FTN waveform). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to rearrangement scheme for low PAPR FTN waveform). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of rearrangement scheme for low PAPR FTN waveform as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for receiving a phase rearrangement indication from a network entity, the phase rearrangement indication indicating one or more parameters associated with a phase rearrangement process for a FTN DTF-s-OFDM transmission scheme. The communications manager 520 may be configured as or otherwise support a means for transmitting a signal based on the phase rearrangement indication and according to the FTN DTF-s-OFDM transmission scheme.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced processing, low complexity, reduced power consumption, more efficient utilization of communication resources, and reduced errors.

FIG. δ illustrates a block diagram 600 of a device 605 that supports rearrangement schemes for low PAPR FTN DTF-s-OFDM waveforms in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to rearrangement scheme for low PAPR FTN waveform). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to rearrangement scheme for low PAPR FTN waveform). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of rearrangement scheme for low PAPR FTN waveform as described herein. For example, the communications manager 620 may include a phase rearrangement manager 625 an FTN modulation manager 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The phase rearrangement manager 625 may be configured as or otherwise support a means for receiving a phase rearrangement indication from a network entity, the phase rearrangement indication indicating one or more parameters associated with a phase rearrangement process for a FTN DTF-s-OFDM transmission scheme. The FTN modulation manager 630 may be configured as or otherwise support a means for transmitting a signal based on the phase rearrangement indication and according to the FTN DTF-s-OFDM transmission scheme.

Figure 7:
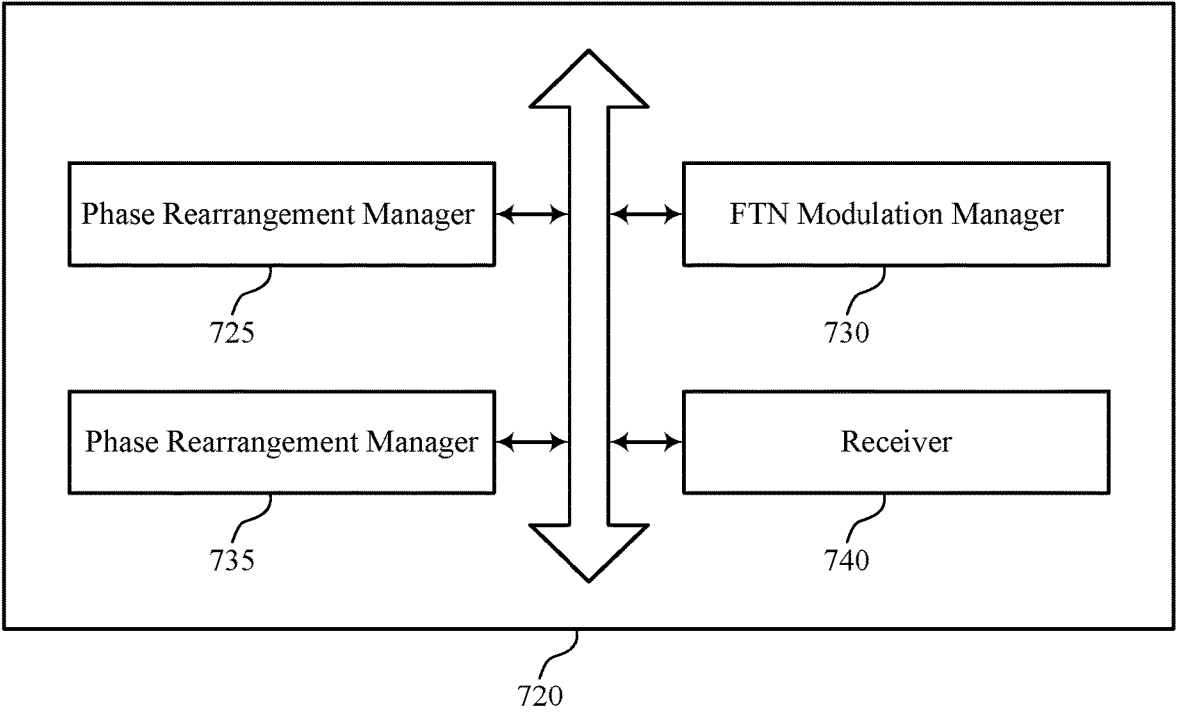
FIG. 7 illustrates a block diagram of a communications manager that supports rearrangement schemes for low PAPR FTN DTF-s-OFDM waveforms in accordance with one or more aspects of the present disclosure.
Figure 7:

FIG. 7 illustrates a block diagram 700 of a communications manager 720 that supports rearrangement schemes for low PAPR FTN DTF-s-OFDM waveforms in accordance with one or more aspects of the present disclosure. The communications manager 720 may be an example of aspects of a communications manager 520, a communications manager 620, or both, as described herein. The communications manager 720, or various components thereof, may be an example of means for performing various aspects of rearrangement scheme for low PAPR FTN waveform as described herein. For example, the communications manager 720 may include a phase rearrangement manager 725, an FTN modulation manager 730, a phase rearrangement manager 735, a receiver 740, or any combination thereof. Each of these components may communicate, directly or indirectly, with one another (e.g., via one or more buses).

The communications manager 720 may support wireless communication at a UE in accordance with examples as disclosed herein. The phase rearrangement manager 725 may be configured as or otherwise support a means for receiving a phase rearrangement indication from a network entity, the phase rearrangement indication indicating one or more parameters associated with a phase rearrangement process for a FTN DTF-s-OFDM transmission scheme. The FTN modulation manager 730 may be configured as or otherwise support a means for transmitting a signal based on the phase rearrangement indication and according to the FTN DTF-s-OFDM transmission scheme.

In some examples, the one or more parameters include at least one of an up-sampling factor, an acceleration factor, or an indication of a pulse shaping filter.

In some examples, the phase rearrangement manager 735 may be configured as or otherwise support a means for determining a phase difference between a first input sample and a second input sample adjacent to the first input sample, and where the signal is based on the first input sample and the second input sample.

In some examples, the phase rearrangement process distributes the phase difference over a number of repetitions of the first input sample based on the one or more parameters associated with the phase rearrangement process.

In some examples, the phase difference is distributed among each consecutive repetition of the first input sample based on the phase rearrangement process. In some examples, the number of repetitions of the first input sample is based on an up-sampling factor.

In some examples, the phase rearrangement process identifies that the phase difference is to be distributed evenly among each consecutive or adjacent repetition of the first input sample.

In some examples, the phase rearrangement process rotates a phase of each of the repetitions of the first input sample based on a delta phase step and a repetition index. In some examples, the delta phase step is based on the phase difference and the number of repetitions of the first input sample.

In some examples, to support receiving the phase rearrangement indication, the receiver 740 may be configured as or otherwise support a means for receiving the phase rearrangement indication via at least one of an RRC configuration, an RRC reconfiguration, a MAC CE, or a DCI signal.

In some examples, the phase rearrangement process is applied to encoded bits after up-sampling the encoded bits and before filter shaping the encoded bits. In some examples, the signal is based on the information bits.

Figure 8:
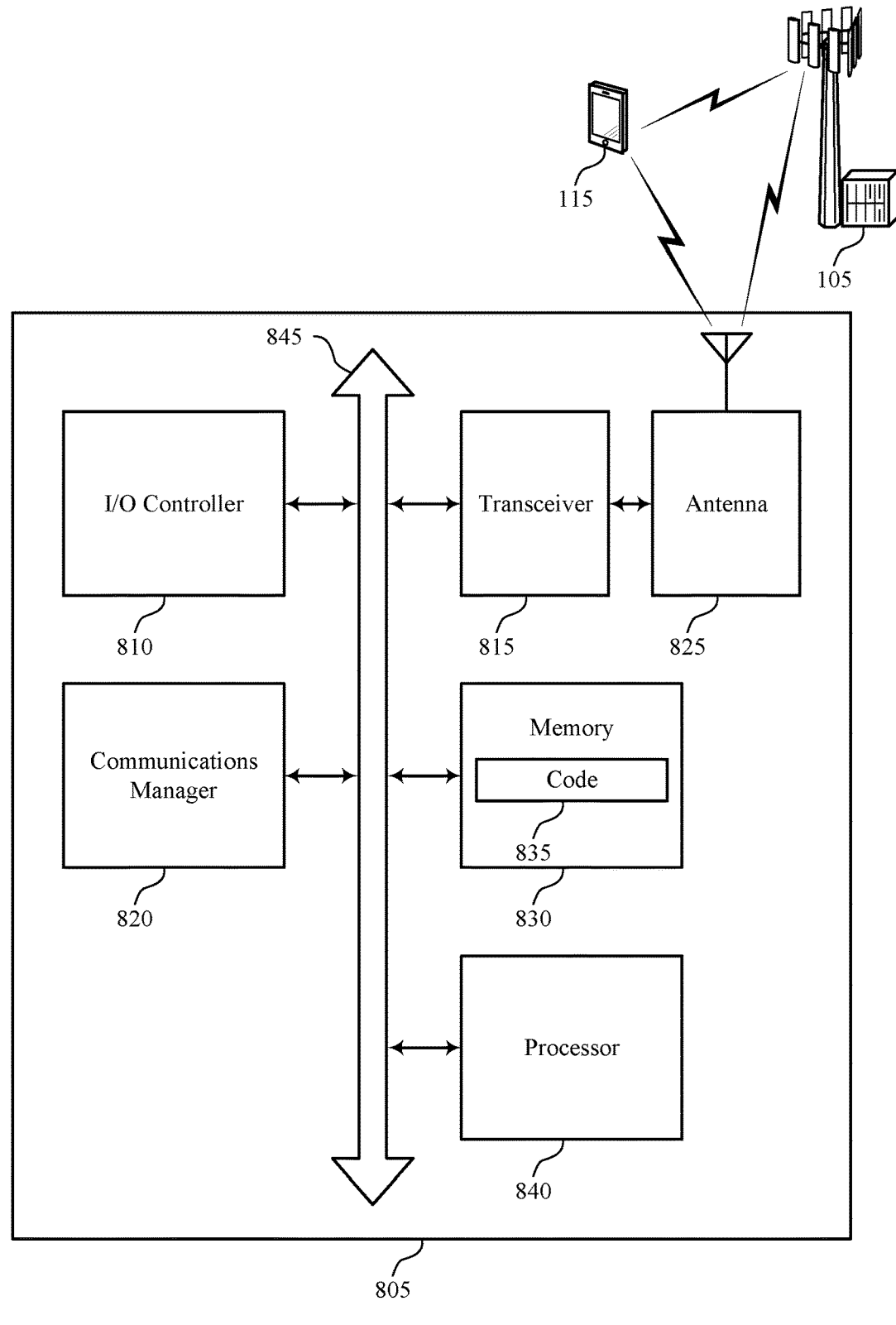
FIG. 8 illustrates a diagram of a system including a device that supports rearrangement schemes for low PAPR FTN DTF-s-OFDM waveforms in accordance with one or more aspects of the present disclosure.

FIG. 8 illustrates a diagram of a system 800 including a device 805 that supports rearrangement schemes for low PAPR FTN DTF-s-OFDM waveforms in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting rearrangement scheme for low PAPR FTN waveform). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving a phase rearrangement indication from a network entity, the phase rearrangement indication indicating one or more parameters associated with a phase rearrangement process for a FTN DTF-s-OFDM transmission scheme. The communications manager 820 may be configured as or otherwise support a means for transmitting a signal based on the phase rearrangement indication and according to the FTN DTF-s-OFDM transmission scheme.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of rearrangement scheme for low PAPR FTN waveform as described herein, or the processor 840 and the memory 830 may be otherwise configured to perform or support such operations.

Figure 9:
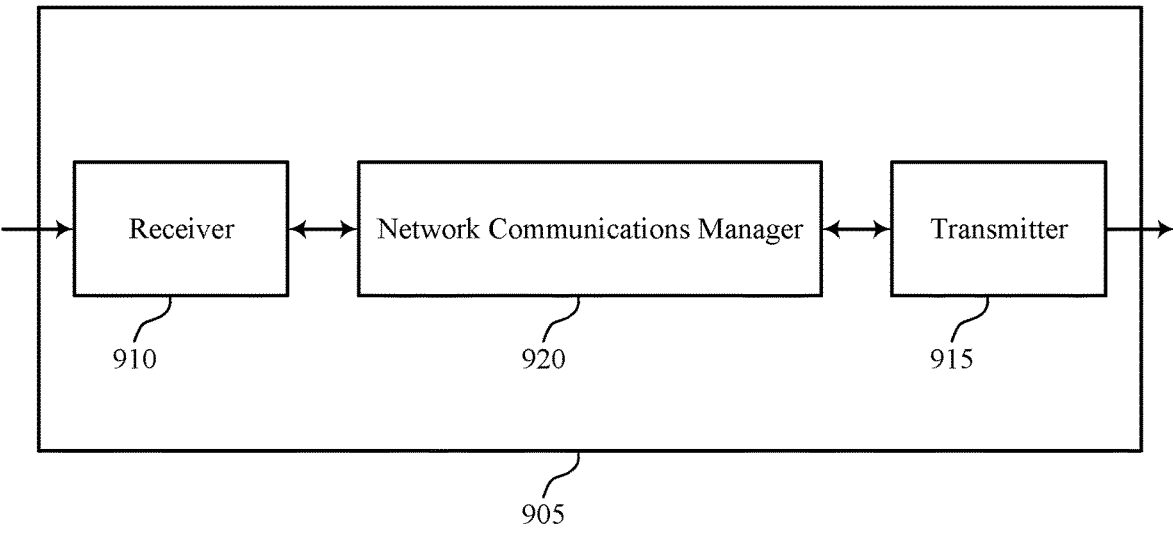
FIGS. 9 and 10 illustrate block diagrams of devices that support rearrangement scheme for low PAPR FTN waveform in accordance with one or more aspects of the present disclosure.

FIG. 9 illustrates a block diagram 900 of a device 905 that supports rearrangement schemes for low PAPR FTN DTF-s-OFDM waveforms in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., UQ samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of rearrangement scheme for low PAPR FTN waveform as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for transmitting a phase rearrangement indication to a UE, the phase rearrangement indication indicating one or more parameters associated with a phase rearrangement process for a FTN DTF-s-OFDM transmission scheme. The communications manager 920 may be configured as or otherwise support a means for receiving a signal based on the phase rearrangement indication and according to the FTN discrete Fourier transformation spread orthogonal frequency transmission scheme.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing, low complexity, reduced power consumption, more efficient utilization of communication resources, and reduced errors.

Figure 10:
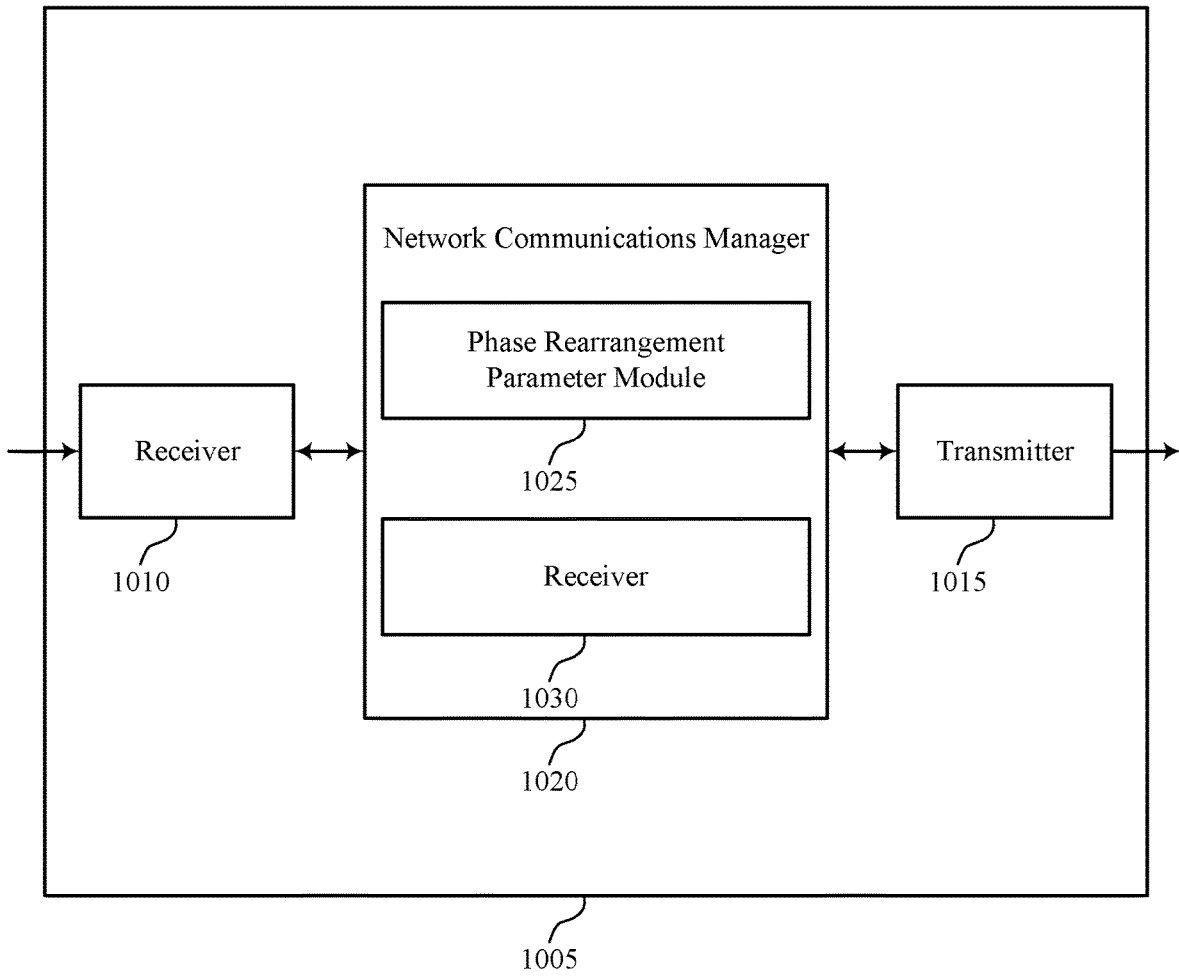

FIG. 10 illustrates a block diagram 1000 of a device 1005 that supports rearrangement schemes for low PAPR FTN DTF-s-OFDM waveforms in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., UQ samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas.

Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., UQ samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of rearrangement scheme for low PAPR FTN waveform as described herein. For example, the communications manager 1020 may include a phase rearrangement parameter module 1025 a receiver 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The phase rearrangement parameter module 1025 may be configured as or otherwise support a means for transmitting a phase rearrangement indication to a UE, the phase rearrangement indication indicating one or more parameters associated with a phase rearrangement process for a FTN DTF-s-OFDM transmission scheme. The receiver 1030 may be configured as or otherwise support a means for receiving a signal based on the phase rearrangement indication and according to the FTN discrete Fourier transformation spread orthogonal frequency transmission scheme.

Figure 11:
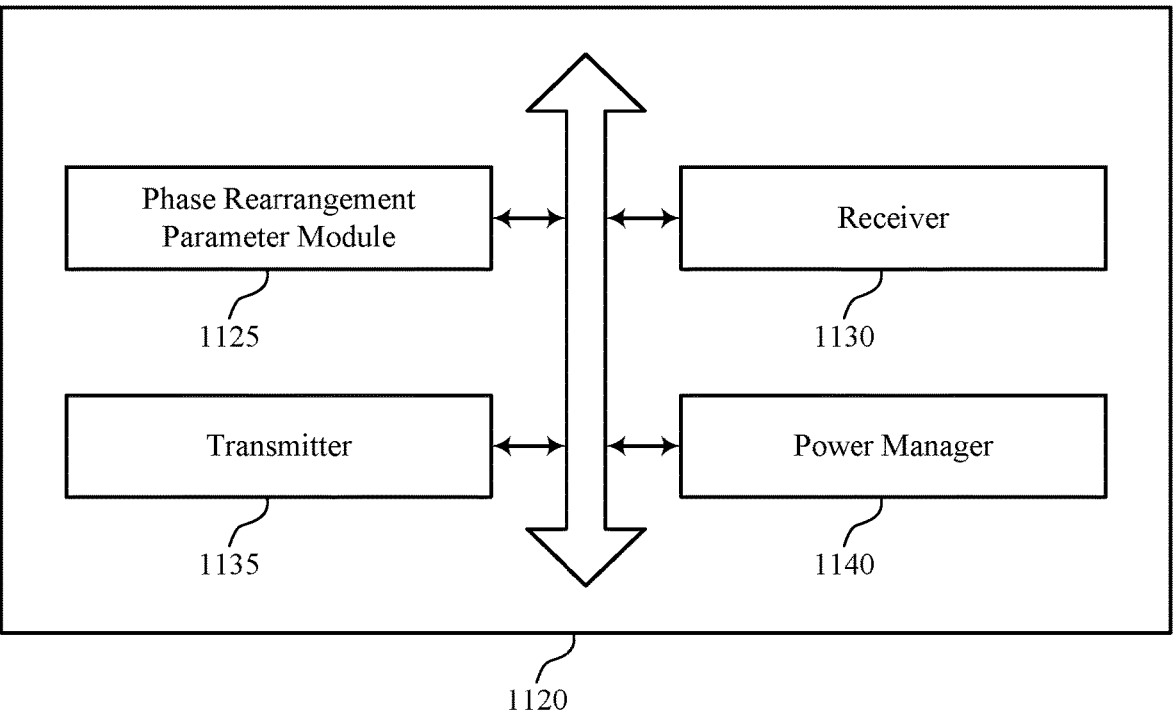
FIG. 11 illustrates a block diagram of a communications manager that supports rearrangement schemes for low PAPR FTN DTF-s-OFDM waveforms in accordance with one or more aspects of the present disclosure.

FIG. 11 illustrates a block diagram 1100 of a communications manager 1120 that supports rearrangement schemes for low PAPR FTN DTF-s-OFDM waveforms in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of rearrangement scheme for low PAPR FTN waveform as described herein. For example, the communications manager 1120 may include a phase rearrangement parameter module 1125, a receiver 1130, a transmitter 1135, a power manager 1140, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The phase rearrangement parameter module 1125 may be configured as or otherwise support a means for transmitting a phase rearrangement indication to a UE, the phase rearrangement indication indicating one or more parameters associated with a phase rearrangement process for a FTN DTF-s-OFDM transmission scheme. The receiver 1130 may be configured as or otherwise support a means for receiving a signal based on the phase rearrangement indication and according to the FTN DTF-s-OFDM transmission scheme.

In some examples, the one or more parameters include at least one of an up-sampling factor, an acceleration factor, or an indication of a pulse shaping filter.

In some examples, to support transmitting the phase rearrangement indication, the transmitter 1135 may be configured as or otherwise support a means for transmitting the phase rearrangement indication via at least one of a radio resource control configuration, a radio resource control reconfiguration, a MAC CE, or a DCI signal.

In some examples, the power manager 1140 may be configured as or otherwise support a means for determining a PAPR of the signal. In some examples, the power manager 1140 may be configured as or otherwise support a means for comparing the PAPR of the signal to a threshold PAPR. In some examples, the phase rearrangement parameter module 1125 may be configured as or otherwise support a means for transmitting an updated phase rearrangement indication to the UE based on comparing the PAPR of the signal to the threshold PAPR.

Figure 12:
FIG. 12 illustrates a diagram of a system including a device that supports rearrangement schemes for low PAPR FTN DTF-s-OFDM waveforms in accordance with one or more aspects of the present disclosure.

FIG. 12 illustrates a diagram of a system 1200 including a device 1205 that supports rearrangement schemes for low PAPR FTN DTF-s-OFDM waveforms in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting rearrangement scheme for low PAPR FTN waveform). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for transmitting a phase rearrangement indication to a UE, the phase rearrangement indication indicating one or more parameters associated with a phase rearrangement process for a FTN DTF-s-OFDM transmission scheme. The communications manager 1220 may be configured as or otherwise support a means for receiving a signal based on the phase rearrangement indication and according to the FTN discrete Fourier transformation spread orthogonal frequency transmission scheme.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of rearrangement scheme for low PAPR FTN waveform as described herein, or the processor 1235 and the memory 1225 may be otherwise configured to perform or support such operations.

FIG. 13 illustrates a flowchart illustrating a method 1300 that supports rearrangement schemes for low PAPR FTN DTF-s-OFDM waveforms in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving a phase rearrangement indication from a network entity, the phase rearrangement indication indicating one or more parameters associated with a phase rearrangement process for a DTF-s-OFDM transmission scheme. The operations of 1305 may be performed in accordance with examples as disclosed herein. In some examples, aspects of the operations of 1305 may be performed by a phase rearrangement manager 725 as described with reference to FIG. 7.

At 1310, the method may include transmitting a signal based on the phase rearrangement indication and according to the FTN DTF-s-OFDM transmission scheme. The operations of 1310 may be performed in accordance with examples as disclosed herein. In some examples, aspects of the operations of 1310 may be performed by an FTN modulation manager 730 as described with reference to FIG. 7.

FIG. 14 illustrates a flowchart illustrating a method 1400 that supports rearrangement schemes for low PAPR FTN DTF-s-OFDM waveforms in accordance with one or more aspects of the present disclosure. The operations of the method 1400 may be implemented by a network entity or its components as described herein. For example, the operations of the method 1400 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1405, the method may include transmitting a phase rearrangement indication to a UE, the phase rearrangement indication indicating one or more parameters associated with a phase rearrangement process for a FTN DTF-s-OFDM transmission scheme. The operations of 1405 may be performed in accordance with examples as disclosed herein. In some examples, aspects of the operations of 1405 may be performed by a phase rearrangement parameter module 1125 as described with reference to FIG. 11.

At 1410, the method may include receiving a signal based on the phase rearrangement indication and according to the FTN DTF-s-OFDM transmission scheme. The operations of 1410 may be performed in accordance with examples as disclosed herein. In some examples, aspects of the operations of 1410 may be performed by a receiver 1130 as described with reference to FIG. 11.

Aspect 1: A method for wireless communication at a UE, comprising: receiving a phase rearrangement signal from a network entity, the phase rearrangement signal indicating one or more parameters associated with a phase rearrangement process for a FTN DTF-s-OFDM transmission scheme; and transmitting a signal based at least in part on the phase rearrangement signal and according to the FTN DTF-s-OFDM transmission scheme.

Aspect 2: The method of aspect 1, wherein the one or more parameters comprise at least one of an up-sampling factor, an acceleration factor, or an indication of a pulse shaping filter.

Aspect 3: The method of any of aspects 1 through 2, further comprising: determining a phase difference between a first input sample and a second input sample adjacent to the first input sample, and wherein the signal is based at least in part on the first input sample and the second input sample.

Aspect 4: The method of aspect 3, wherein the phase rearrangement process distributes the phase difference over a number of repetitions of the first input sample based at least in part on the one or more parameters associated with the phase rearrangement process.

Aspect 5: The method of aspect 4, wherein the phase difference is distributed among each consecutive repetition of the first input sample based at least in part on the phase rearrangement process, and the number of repetitions of the first input sample is based on an up-sampling factor.

Aspect 6: The method of aspect 5, wherein the phase rearrangement process identifies that the phase difference is to be distributed evenly among each consecutive repetition of the first input sample.

Aspect 7: The method of any of aspects 4 through 6, wherein the phase rearrangement process rotates a phase of each of the repetitions of the first input sample based at least in part on a delta phase step and a repetition index, the delta phase step is based at least in part on the phase difference and the number of repetitions of the first input sample.

Aspect 8: The method of any of aspects 1 through 7, wherein receiving the phase rearrangement signal further comprises: receiving the phase rearrangement signal via at least one of a radio resource control configuration, a radio resource control reconfiguration, a media access control element, or a DCI signal.

Aspect 9: The method of any of aspects 1 through 8, wherein the phase rearrangement process is applied to information bits after up-sampling the information bits and before filter shaping the information bits, the signal is based at least in part on the information bits.

Aspect 10: A method for wireless communication at a network entity, comprising: transmitting a phase rearrangement signal to a UE, the phase rearrangement signal indicating one or more parameters associated with a phase rearrangement process for a FTN DTF-s-OFDM transmission scheme; and receiving a signal based at least in part on the phase rearrangement signal and according to the Faster-Than-Nyquist discrete Fourier transformation spread orthogonal frequency transmission scheme.

Aspect 11: The method of aspect 10, wherein the one or more parameters comprise at least one of an up-sampling factor, an acceleration factor, or an indication of a pulse shaping filter.

Aspect 12: The method of any of aspects 10 through 11, wherein transmitting the phase rearrangement signal further comprises: transmitting the phase rearrangement signal via at least one of a radio resource control configuration, a radio resource control reconfiguration, a media access control element, or a DCI signal.

Aspect 13: The method of any of aspects 10 through 12, further comprising: determining a peak-to-average power ratio of the signal; comparing the peak-to-average power ratio of the signal to a threshold peak-to-average power ratio; and transmitting an updated phase rearrangement signal to the UE based at least in part on comparing the peak-to-average power ratio of the signal to the threshold peak-to-average power ratio.

Aspect 14: An apparatus for wireless communication at a UE, comprising a processor; memory coupled with the processor; and instructions stored in the memory and executable by the processor to cause the apparatus to perform a method of any of aspects 1 through 9.

Aspect 15: An apparatus for wireless communication at a UE, comprising at least one means for performing a method of any of aspects 1 through 9.

Aspect 16: A non-transitory computer-readable medium storing code for wireless communication at a UE, the code comprising instructions executable by a processor to perform a method of any of aspects 1 through 9.

Aspect 17: An apparatus for wireless communication at a network entity, comprising a processor; memory coupled with the processor; and instructions stored in the memory and executable by the processor to cause the apparatus to perform a method of any of aspects 10 through 13.

Aspect 18: An apparatus for wireless communication at a network entity, comprising at least one means for performing a method of any of aspects 10 through 13.

Aspect 19: A non-transitory computer-readable medium storing code for wireless communication at a network entity, the code comprising instructions executable by a processor to perform a method of any of aspects 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
one or more processors;
memory coupled with the one or more processors; and
instructions stored in the memory and executable by the one or more processors to cause the apparatus to:
receive a phase rearrangement indication from a network entity, the phase rearrangement indication indicating one or more parameters associated with a phase rearrangement process for a Faster-Than-Nyquist discrete Fourier transformation spread orthogonal frequency division multiplexing transmission scheme, wherein the phase rearrangement process distributes a phase difference between a first input sample and a second input sample adjacent to the first input sample over a number of repetitions of the first input sample based at least in part on the one or more parameters associated with the phase rearrangement process; and
transmit a signal based at least in part on the phase rearrangement indication and according to the Faster-Than-Nyquist discrete Fourier transformation spread orthogonal frequency division multiplexing transmission scheme.

2. The apparatus of claim 1, wherein the one or more parameters comprise at least one of an up-sampling factor, an acceleration factor, or an indication of a pulse shaping filter.

3. The apparatus of claim 1, wherein the instructions are further executable by the one or more processors to cause the apparatus to:
determine the phase difference between the first input sample and the second input sample, and wherein the signal is based at least in part on the first input sample and the second input sample.

4. The apparatus of claim 1, wherein:
the phase difference is distributed among each consecutive repetition of the first input sample based at least in part on the phase rearrangement process, and
the number of repetitions of the first input sample is based on an up-sampling factor.

5. The apparatus of claim 4, wherein the phase rearrangement process identifies that the phase difference is to be distributed evenly among each consecutive repetition of the first input sample.

6. The apparatus of claim 1, wherein:
the phase rearrangement process rotates a phase of each of the repetitions of the first input sample based at least in part on a delta phase step and a repetition index, and
the delta phase step is based at least in part on the phase difference and the number of repetitions of the first input sample.

7. The apparatus of claim 1, wherein the instructions to receive the phase rearrangement indication are further executable by the one or more processors to cause the apparatus to:

receive the phase rearrangement indication via at least one of a radio resource control configuration, a radio resource control reconfiguration, a media access control control element, or a downlink control information signal.

8. The apparatus of claim 1, wherein:
the phase rearrangement process is applied to samples after up-sampling encoded bits and before filter shaping the samples, and
the signal is based at least in part on the encoded bits.

9. An apparatus for wireless communication at a network entity, comprising:
one or more processors;
memory coupled with the one or more processors; and
instructions stored in the memory and executable by the one or more processors to cause the apparatus to:
transmit a phase rearrangement indication to a user equipment (UE), the phase rearrangement indication indicating one or more parameters associated with a phase rearrangement process for a Faster-Than-Nyquist discrete Fourier transformation spread orthogonal frequency division multiplexing transmission scheme, wherein the phase rearrangement process distributes a phase difference between a first input sample and a second input sample adjacent to the first input sample over a number of repetitions of the first input sample based at least in part on the one or more parameters associated with the phase rearrangement process; and
receive a signal based at least in part on the phase rearrangement indication and according to the Faster-Than-Nyquist discrete Fourier transformation spread orthogonal frequency division multiplexing transmission scheme.

10. The apparatus of claim 9, wherein the one or more parameters comprise at least one of an up-sampling factor, an acceleration factor, or an indication of a pulse shaping filter.

11. The apparatus of claim 9, wherein the instructions to transmit the phase rearrangement indication are further executable by the one or more processors to cause the apparatus to:
transmit the phase rearrangement indication via at least one of a radio resource control configuration, a radio resource control reconfiguration, a media access control control element, or a downlink control information signal.

12. The apparatus of claim 9, wherein the instructions are further executable by the one or more processors to cause the apparatus to:
determine a peak-to-average power ratio of the signal;
compare the peak-to-average power ratio of the signal to a threshold peak-to-average power ratio; and
transmit an updated phase rearrangement indication to the UE based at least in part on comparing the peak-to-average power ratio of the signal to the threshold peak-to-average power ratio.

13. A method for wireless communication at a user equipment (UE), comprising:
receiving a phase rearrangement indication from a network entity, the phase rearrangement indication indicating one or more parameters associated with a phase rearrangement process for a Faster-Than-Nyquist discrete Fourier transformation spread orthogonal frequency division multiplexing transmission scheme, wherein the phase rearrangement process distributes a phase difference between a first input sample and a second input sample adjacent to the first input sample over a number of repetitions of the first input sample based at least in part on the one or more parameters associated with the phase rearrangement process; and transmitting a signal based at least in part on the phase rearrangement indication and according to the Faster-Than-Nyquist discrete Fourier transformation spread orthogonal frequency division multiplexing transmission scheme.

14. The method of claim 13, wherein the one or more parameters comprise at least one of an up-sampling factor, an acceleration factor, or an indication of a pulse shaping filter.

15. The method of claim 13, further comprising:

determining the phase difference between the first input sample and the second input sample, and wherein the signal is based at least in part on the first input sample and the second input sample.

16. The method of claim 13, wherein:

the phase difference is distributed among each consecutive repetition of the first input sample based at least in part on the phase rearrangement process, and the number of repetitions of the first input sample is based on an up-sampling factor.

17. The method of claim 16, wherein the phase rearrangement process identifies that the phase difference is to be distributed evenly among each consecutive repetition of the first input sample.

18. The method of claim 13, wherein:

the phase rearrangement process rotates a phase of each of the repetitions of the first input sample based at least in part on a delta phase step and a repetition index, and the delta phase step is based at least in part on the phase difference and the number of repetitions of the first input sample.

* * * * *